United States Patent
Hashimoto

(10) Patent No.: US 12,235,407 B2
(45) Date of Patent: Feb. 25, 2025

(54) INPUT/OUTPUT DEVICE

(71) Applicant: OMRON Corporation, Kyoto (JP)

(72) Inventor: Minoru Hashimoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/263,149

(22) PCT Filed: Dec. 20, 2021

(86) PCT No.: PCT/JP2021/047097
§ 371 (c)(1),
(2) Date: Jul. 27, 2023

(87) PCT Pub. No.: WO2022/176372
PCT Pub. Date: Aug. 25, 2022

(65) Prior Publication Data
US 2024/0085586 A1  Mar. 14, 2024

(30) Foreign Application Priority Data

Feb. 18, 2021  (JP) .................................. 2021-024307

(51) Int. Cl.
*G01V 8/20* (2006.01)
(52) U.S. Cl.
CPC ..................... *G01V 8/20* (2013.01)
(58) Field of Classification Search
CPC ..... G01V 8/20; G01V 8/22; F16P 3/14; F16P 3/144; G01N 21/84; G01N 21/31; G01N 33/12
See application file for complete search history.

(56) References Cited

U.S. PATENT DOCUMENTS

| 6,414,603 B1 | 7/2002 | Yamaguchi et al. |
| 2006/0182308 A1 | 8/2006 | Gerlach et al. |

(Continued)

FOREIGN PATENT DOCUMENTS

| CN | 203324829 U | * 12/2013 | ............... G05D 3/12 |
| EP | 3214466 A1 | 9/2017 | |

(Continued)

OTHER PUBLICATIONS

International Search Report issued in Intl. Appln. No. PCT/JP2021/047097, mailed Mar. 15, 2022. English translation provided.

(Continued)

*Primary Examiner* — Georgia Y Epps
*Assistant Examiner* — Don J Williams
(74) *Attorney, Agent, or Firm* — ROSSI, KIMMS & McDOWELL LLP

(57) ABSTRACT

A technique allows outputting light reception results of a sensor to an external device with a reduced volume of data while maintaining the features of the results. An input/output device receives light reception results of the sensor and outputs the results to the external device. The sensor includes light receivers to receive light emitted from light emitters. The input/output device has a smaller maximum volume of data transmittable per unit time in communicating with the external device than in communicating with the sensor. The input/output device includes an obtainer that obtains the light reception results, an analyzer that analyzes the light reception results and detects a boundary between a portion of the sensor that has received light and a portion of the sensor that has received no light, and an output unit that outputs data indicating a position of the boundary detected by the analyzer to the external device.

14 Claims, 10 Drawing Sheets

(56) References Cited

U.S. PATENT DOCUMENTS

| | | | |
|---|---|---|---|
| 2015/0330906 A1* | 11/2015 | Wakita | G01N 21/84 356/432 |
| 2017/0052278 A1 | 2/2017 | Stein et al. | |
| 2017/0254922 A1 | 9/2017 | Bürger et al. | |
| 2021/0302617 A1* | 9/2021 | Send | G01V 8/20 |

FOREIGN PATENT DOCUMENTS

| | | | |
|---|---|---|---|
| JP | S6177423 | A | 4/1986 |
| JP | H11345548 | A | 12/1999 |
| JP | 2002124169 | A | 4/2002 |
| JP | 2002198568 | A | 7/2002 |
| JP | 2007524808 | A | 8/2007 |
| JP | 2011232077 | A | 11/2011 |
| JP | 2012124169 | A | 6/2012 |
| JP | 2019139510 | A | 8/2019 |

OTHER PUBLICATIONS

Written Opinion issued in Intl. Appln. No. PCT/JP2021/047097, mailed Mar. 15, 2022. English translation provided.
Extended European Search Report issued in European Appln. No. 21926795.2, mailed Nov. 21, 2024.
Extended European Search Report issued in Intl. Appln. No. 21926795.2, mailed Nov. 21, 2024.

* cited by examiner

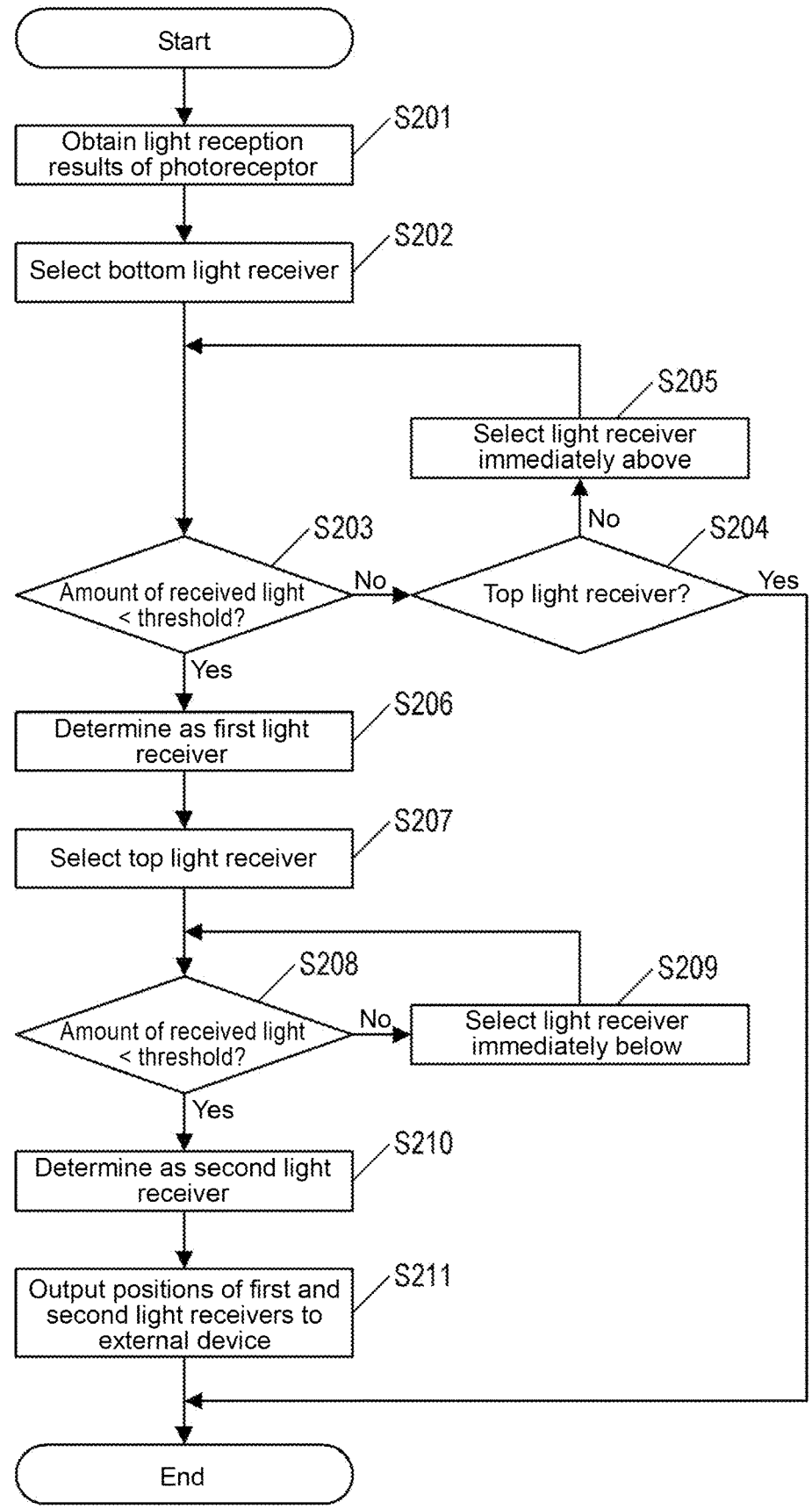

OBJECT

INPUT/OUTPUT DEVICE

FIELD

The present invention relates to a technique for inputting and outputting data.

BACKGROUND

A system including a safety light curtain is known as a sensing system for detecting passage of a carried object or intrusion of an operator into a hazardous area. A safety light curtain includes a light emitting device including multiple light emitters and a photoreceptor (sensor) including multiple light receivers.

The safety light curtain includes many light receivers (and light emitters), and light reception results of the light receivers have a large data volume. The transmission rate (maximum volume of data transmittable per unit time) of a transmission line between the safety light curtain and an external device may block timely transmission of data indicating light reception results of the light receivers to the external device. In such a case, the external device may, for example, fail to reflect the light reception results to processing in real time.

Patent Literature 1 describes a technique for storing evaluation results indicating whether light reception results of a sensor (light reception results of multiple light receivers) satisfy predetermined criteria.

CITATION LIST

Patent Literature

Patent Literature 1: European Patent No. 3214466

SUMMARY

Technical Problem

With the technique described in Patent Literature 1, the evaluation results are data indicating whether the results satisfy predetermined criteria, or more specifically, binary data. Thus, outputting these evaluation results to the external device instead the light reception results of the sensor (light reception results of the light receivers) greatly reduces the accuracy of a process (process based on the light reception results of the sensor) performed by the external device.

In response to the above issue, one or more aspects of the present invention are directed to a technique for outputting light reception results of a sensor to an external device with a reduced volume of data while maintaining the features of the results.

Solution to Problem

The device, method, and program according to one or more aspects of the present invention have the structure below.

An input/output device according to a first aspect of the present invention is a device for receiving light reception results of a sensor and outputting the light reception results to an external device. The sensor includes a plurality of light receivers to receive light emitted from a plurality of light emitters. The input/output device has a smaller maximum volume of data transmittable per unit time in communicating with the external device than in communicating with the sensor. The input/output device includes an obtainer that obtains the light reception results, an analyzer that analyzes the light reception results and detects a boundary between a portion of the sensor that has received light and a portion of the sensor that has received no light, and an output unit that outputs data indicating a position of the boundary detected by the analyzer to the external device.

For example, the obtainer is an input terminal, the analyzer is a processor, and the output unit is an output terminal. Examples of light reception results of a sensor include data indicating the amount of received light of each light receiver and data indicating whether each light receiver has received light. Communications between the input/output device and the external device may be either wired or wireless communications in accordance with, for example, the IO-Link or Bluetooth standard. A portion of the sensor that has received light has, for example, an amount of received light reaching or exceeding a threshold. A portion of the sensor that has received no light has, for example, an amount of received light below the threshold. A boundary between the portions of the sensor that have received light and no light is located at, for example, the middle of the two light receivers (light receiver that has received light and light receiver that has received no light) adjacent to each other across the boundary or at one of the two light receivers. The external device is, for example, a programmable logic controller (PLC).

Typically, as the number of values indicated with data decreases, the data size decreases. Thus, the data size indicating the position of the boundary between the portions of the sensor that have received light and no light is smaller than the data size of the light reception results of the sensor (light reception results of light receivers). Finding the position of the boundary allows detection of the outline of an object passing between the light emitters and the light receivers.

The above structure outputs data indicating the position of the boundary between the portions of the sensor that have received light and no light to the external device, instead of the light reception results of the sensor. This allows a smaller volume of data to be output to the external device than when the light reception results of the sensor are directly output to the external device. The external device can detect the outline of an object passing between the light emitters and the light receivers. Light from the light emitters is basically interrupted by the object. However, when the object has a hole, light reaches the light receivers through the hole. Thus, the external device can detect the hole in the object from the data indicating the position of the boundary between the portions of the sensor that have received light and no light.

The output unit may output, to the external device, data indicating a position of, from among boundaries between portions of the sensor that have received light and portions of the sensor that have received no light, a boundary at a first end position in a direction in which the plurality of light receivers are arranged (first structure). The output unit may output, to the external device, data indicating positions of, from among boundaries between portions of the sensor that have received light and portions of the sensor that have received no light, a boundary at a first end position in a direction in which the plurality of light receivers are arranged and a boundary at a second end position in the direction in which the plurality of light receivers are arranged (second structure). The light receivers are arranged in, for example, a straight line such as a vertical direction. The light receivers may be arranged in a curve.

Thus, the data volume output to the external device can be further reduced. Although the external device cannot detect a hole in the object passing between the light emitters and the light receivers, the external device can detect the object outline. In the first structure, for example, the outline of the carried object can be detected by regarding the bottom position of the sensor as the bottom position of the carried object and regarding the position of the top boundary as the top position of the carried object. In another example, the top position of the sensor may be regarded as the top position of the carried object and the position of the bottom boundary may be regarded as the bottom position of the carried object.

An input/output device according to a second aspect of the present invention is a device for receiving light reception results of a sensor and outputting the light reception results to an external device. The sensor includes a plurality of light receivers to receive light emitted from a plurality of light emitters. The input/output device has a smaller maximum volume of data transmittable per unit time in communicating with the external device than in communicating with the sensor. The input/output device includes an obtainer that obtains the light reception results, an analyzer that analyzes the light reception results and detects the number of light receivers that have received no light, and an output unit that outputs data indicating the number detected by the analyzer to the external device.

Finding the number of light receivers that have received no light allows detection of the outline of an object passing between the light emitters and the light receivers. For example, a horizontally carried object is detected with the perpendicularly (vertically) arranged light receivers. In this case, regarding the number of light receivers that have received no light as the height of the carried object allows detection of the outline of the carried object.

The above structure outputs data indicating the number of light receivers that have received no light to the external device, instead of the light reception results of the sensor. This allows a smaller volume of data to be output to the external device than when the light reception results of the sensor are directly output to the external device. The external device can detect the outline of an object passing between the light emitters and the light receivers.

An input/output device according to a third aspect of the present invention is a device for receiving light reception results of a sensor and outputting the light reception results to an external device. The sensor includes a plurality of light receivers to receive light emitted from a plurality of light emitters. The input/output device has a smaller maximum volume of data transmittable per unit time in communicating with the external device than in communicating with the sensor. The input/output device includes an obtainer that obtains the light reception results, an analyzer that analyzes the light reception results and determines whether each of a plurality of groups includes a light receiver of the plurality of light receivers that has received light, and an output unit that outputs data indicating whether each of the plurality of groups has received light to the external device. The plurality of groups are fewer than the plurality of light receivers.

The above structure outputs data indicating whether each of the groups fewer than the light receivers has received light to the external device, instead of the light reception results of the sensor. This allows a smaller volume of data to be output to the external device than when the light reception results of the sensor are directly output to the external device. The external device can detect the outline of an object passing between the light emitters and the light receivers. Light from the light emitters is basically interrupted by the object. However, when the object has a hole, light reaches the group (light receivers) through the hole. Thus, the external device can detect the hole in the object from the data indicating whether each group has received light.

In the third aspect, the analyzer may determine a group including no light receiver that has received no light as a group receiving light and a group including a light receiver that has received no light as a group receiving no light. Thus, the external device can detect the object outline slightly larger than the actual outline, and may perform various processes based on the object size. This can prevent, for example, a failure in detecting an anomaly in detecting passage of an object larger than a predetermined size as an anomaly.

The obtainer may obtain light reception results of a plurality of sensors. The analyzer may regard the plurality of sensors as a single sensor and analyze the light reception results of the plurality of sensors. This structure can avoid an increase in the data volume output to the external device when the number of sensors increases.

The obtainer may obtain light reception results of a plurality of sensors. The output unit may switch between the plurality of sensors, and output data for the switched sensor. This structure can output more detailed data to the external device than when multiple sensors are regarded as a single sensor. The sensors to be used can be, for example, automatically or manually switched. For example, the output unit switches the sensors to be used in response to an instruction from a user, and an external device analyzes obtained data and provides the analytical results to the user. In this case, the user can obtain analytical results for an intended sensor.

The output unit may further output data indicating time points corresponding to the light reception results to the external device. Thus, the external device can manage data to replace light reception results of the sensor in a manner associated with time points. Examples of time points corresponding to the light reception results of the sensor include a time point at which the input/output device obtains the light reception results of the sensor and a time point at which the input/output device outputs data to the external device.

Another aspect of the present invention provides a sensing system including at least part of the above structure or function. Another aspect of the present invention provides a method for controlling an input/output device or a sensing system including at least part of the above process, a program for causing a computer to perform such a method, or a non-transitory computer-readable recording medium recording such a program. The present invention may be implemented by combining the above structures and processes in any possible manner unless any technical contradiction arises.

Advantageous Effects

The structure according to the above aspects of the present invention can output the light reception results of the sensor to the external device in a reduced volume of data while maintaining the features of the results.

BRIEF DESCRIPTION OF THE DRAWINGS

FIG. 2 is a flowchart of an example process of an input/output device according to a first embodiment.

DETAILED DESCRIPTION

Example Use

An example use of a technique according to one or more embodiments of the present invention will be described.

Figure 1A:
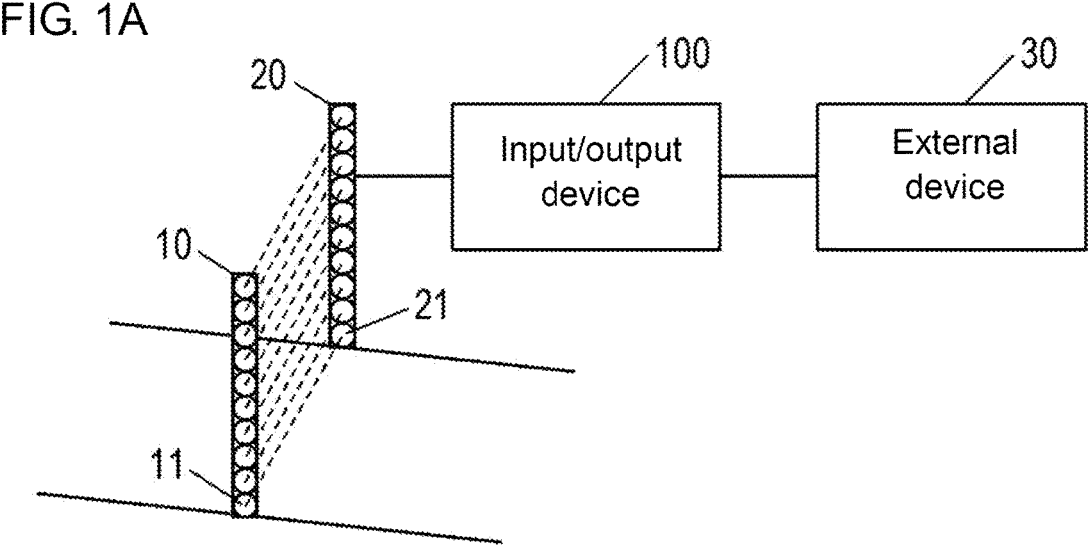
FIG. 1A is a schematic diagram of a sensing system using the technique according to one or more embodiments of the present invention.

FIG. 1A is a schematic diagram of a sensing system using the technique according to one or more embodiments of the present invention. The sensing system includes a light emitting device 10, a photoreceptor 20 (sensor), an input/output device 100, and an external device 30. The light emitting device 10 includes multiple light emitters 11. The photoreceptor 20 includes multiple light receivers 21. For example, the sensing system in FIG. 1A detects passage of a carried object or intrusion of an operator into a hazardous area. The light emitting device 10 and the photoreceptor 20 are included in a safety light curtain.

The light receivers 21 face the light emitters 11 and receive light beams emitted from the light emitters 11. The light emitters 11 and the light receivers 21 are arranged in a vertical (perpendicular) direction in FIG. 1A but may be arranged in any direction. The light emitters 11 or the light receivers 21 may be arranged in a straight line such as a vertical direction, or in a curve.

The input/output device 100 obtains light reception results of the photoreceptor 20 (multiple light receivers 21) and outputs the results to the external device 30. Examples of the light reception results of the photoreceptor 20 include data indicating the amount of received light of each light receiver 21 and data indicating whether each light receiver 21 has received light. The input/output device 100 may be integrated with or separate from the photoreceptor 20.

The external device 30 performs processing based on data from the input/output device 100 (light reception results of the photoreceptor 20). Although not limited to a particular device, the external device 30 is, for example, a programmable logic controller (PLC).

In this example, communications between the input/output device 100 and the external device 30 use a smaller maximum volume of data transmittable per unit time than communications between the input/output device 100 and the photoreceptor 20. Communications between the input/output device 100 and the external device 30 are, for example, in accordance with the IO-Link or Bluetooth standard.

The system includes many light receivers 21 (and many light emitters 11), and light reception results of the light receivers 21 have a large data volume. As described above, a maximum volume of data transmittable per unit time is small between the input/output device 100 and the external device 30. Thus, the transmission rate of a transmission line between the input/output device 100 and the external device 30 may block timely transmission of data indicating light reception results captured from the photoreceptor 20 into the input/output device 100 to the external device 30. In such a case, the external device 30 fails to reflect the light reception results to processing in real time.

In one example, the photoreceptor 20 includes 200 light receivers 21, the light reception result of each light receiver 21 has 1 byte, and the maximum data volume transmittable per cycle is 32 bytes between the input/output device 100 and the external device 30. In this case, the light reception results of all the light receivers 21 amount to 200 bytes of data, which causes transmission in seven cycles.

A known technique stores an evaluation result indicating whether the light reception results of the photoreceptor 20 (light reception results of the light receivers 21) satisfy a predetermined criterion. In this case, the evaluation result is data indicating whether the results satisfy a predetermined criterion, or more specifically, binary data. Thus, outputting this evaluation result to the external device 30 instead of the light reception results of the photoreceptor 20 greatly reduces the accuracy of processing performed by the external device 30 (processing based on the light reception results of the photoreceptor 20).

Figure 1B:
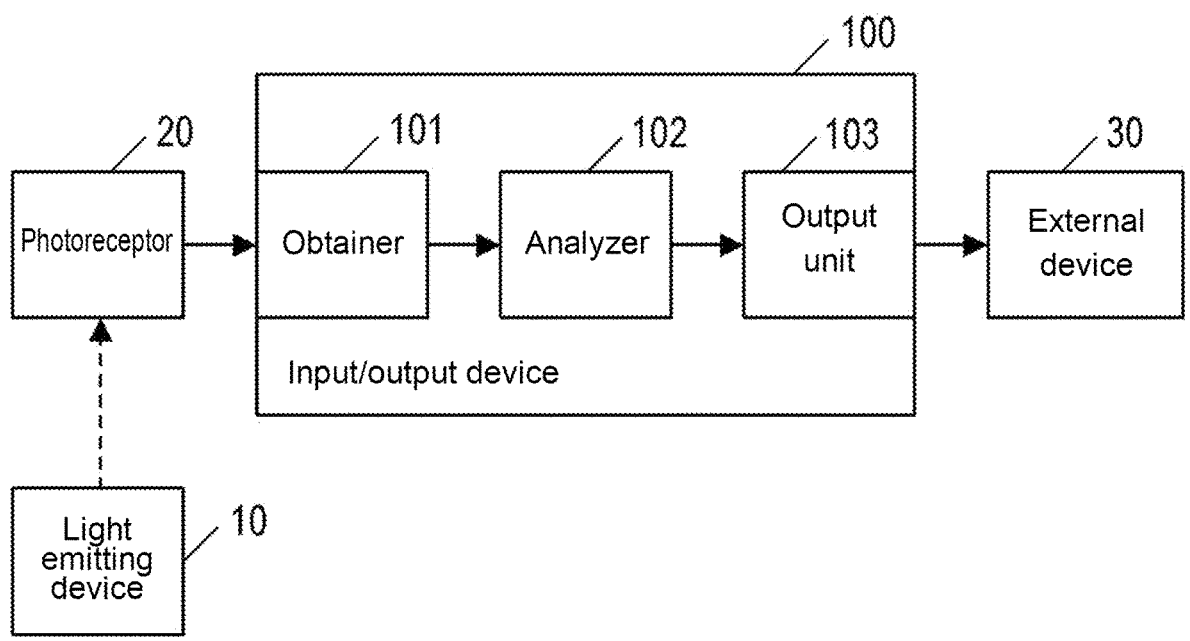
FIG. 1B is a block diagram of the sensing system using the technique according to one or more embodiments of the present invention.

FIG. 1B is a block diagram of the sensing system using the technique according to one or more embodiments of the present invention. FIG. 1B shows an example structure of the input/output device 100. The input/output device 100 includes an obtainer 101, an analyzer 102, and an output unit 103. For example, the obtainer 101 is an input terminal, the analyzer 102 is a processor, and the output unit 103 is an output terminal.

The obtainer 101 obtains the light reception results of the photoreceptor 20. The analyzer 102 analyzes the light reception results obtained by the obtainer 101. The output unit 103 outputs the analytical results of the analyzer 102 to the external device 30, instead of the light reception results obtained by the obtainer 101. The obtainer 101 is an example of an obtainer in an aspect of the present invention, the analyzer 102 is an example of an analyzer in an aspect of the present invention, and the output unit 103 is an example of an output unit in an aspect of the present invention.

Although described in detail in each embodiment, the analyzer 102 analyzes the light reception results of the photoreceptor 20 to output the light reception results to the external device 30 in a reduced volume of data while maintaining the features of the results. A reduced data volume allows the external device 30 to reduce time to obtain data to replace the light reception results of the photoreceptor 20. In addition, maintaining the features of the light reception results of the photoreceptor 20 allows obtaining of, as processing results of the external device 30, processing results equivalent to the processing results obtained when the light reception results of the photoreceptor 20 are used.

First Embodiment

A first embodiment of the present invention will be described. In the first embodiment, the sensing system has the structure shown in FIGS. 1A and 1B.

In the first embodiment, the analyzer 102 analyzes the light reception results of the photoreceptor 20 and detects a boundary between portions of the photoreceptor 20 that have received light and no light. Instead of the light reception results of the photoreceptor 20, the output unit 103 outputs data indicating the position of the boundary detected by the analyzer 102 to the external device 30. For example, the portion of the photoreceptor 20 that has received light has an amount of received light reaching or exceeding a threshold, and the portion of the photoreceptor 20 that has received no light has an amount of received light below a threshold. For example, the boundary between the portions of the photoreceptor 20 that have received light and no light is located at the middle of two light receivers 21 (a light receiver 21 that has received light and a light receiver 21 that has received no light) adjacent to each other across the boundary or at one of the two light receivers 21.

Typically, as the number of values indicated with data decreases, the data size decreases. Thus, the data size indicating the position of the boundary between portions of the photoreceptor 20 that have received light and no light is smaller than the data size of the light reception results of the photoreceptor 20 (light reception results of the light receivers 21). In other words, the above structure allows a smaller volume of data to be output to the external device 30 than when the light reception results of the photoreceptor 20 (light reception results of the light receivers 21) are directly output to the external device 30.

Finding the position of the boundary between portions of the photoreceptor 20 that have received light and no light allows detection of the outline of an object passing between the light emitting device 10 and the photoreceptor 20 (described in detail below). In other words, in the above structure, the external device 30 can detect the outline of the object passing between the light emitting device 10 and the photoreceptor 20.

FIG. 2 is a flowchart of an example process of the input/output device 100. In the process in FIG. 2, of the two light receivers 21 (the light receiver 21 that has received light and the light receiver 21 that has received no light) adjacent to each other across the boundary between portions of the photoreceptor 20 that have received light and no light, the position of the light receiver 21 that has received no light is defined as the position of the boundary. Data indicating, from among the boundaries between portions of the photoreceptor 20 that have received light and no light, the positions of a boundary at a first end position in the direction in which the light receivers 21 are arranged and a boundary at a second end position in the arrangement direction is output to the external device 30, instead of the light reception results of the photoreceptor 20.

The obtainer 101 first obtains the light reception results of the photoreceptor 20 (light reception results of the light receivers 21) from the photoreceptor 20 (step S201).

The analyzer 102 then selects the bottom light receiver 21 from the light receivers 21 (step S202).

The analyzer 102 then determines whether the amount of received light of the selected light receiver 21 is below a predetermined threshold (step S203). The amount of received light can be determined from the light reception results obtained in step S201. When the amount of received light is determined to be below the predetermined threshold (Yes in step S203), the processing advances to step S205. When the amount of received light is determined to reach or exceed the predetermined threshold (No in step S203), the processing advances to step S204.

In step S204, the analyzer 102 determines whether the selected light receiver 21 is a top light receiver 21. When the selected light receiver 21 is determined to be a top light receiver 21 (Yes in step S204), the process ends. When the selected light receiver 21 is determined not to be a top light receiver 21 (No in step S204), the processing advances to step S205. When the selected light receiver 21 is determined to be the top light receiver 21 (Yes in step S204), the output unit 103 may notify the external device 30 that none of the light receivers 21 have received no light (all the light receivers 21 have received light).

In step S205, the analyzer 102 selects the light receiver 21 immediately above the selected light receiver 21 (switches the selected light receiver 21). The processing then returns to step S203. In other words, until the light receiver 21 with an amount of received light below the predetermined threshold is selected, the light receivers 21 are selected one by one in an ascending order.

In step S206, the analyzer 102 determines the selected light receiver 21 as a first light receiver or a bottom one of the light receivers 21 that have received no light.

The analyzer 102 then selects the top light receiver 21 from the light receivers 21 (switches the selected light receiver 21 in step S207).

The analyzer 102 then determines whether the amount of received light of the selected light receiver 21 is below the predetermined threshold (step S208). When the amount of received light is determined to be below the predetermined threshold (Yes in step S208), the processing advances to step S210. When the amount of received light is determined to reach or exceed the predetermined threshold (No in step S208), the processing advances to step S209.

In step S209, the analyzer 102 selects the light receiver 21 immediately below the selected light receiver 21 (switches the selected light receiver 21). The processing then returns to step S208. In other words, until the light receiver 21 with an amount of received light below the predetermined threshold is selected, the light receivers 21 are selected one by one in a descending order.

In step S210, the analyzer 102 determines the selected light receiver 21 as a second light receiver or the top one of the light receivers 21 that have received no light.

The output unit 103 then outputs the position of the first light receiver determined in step S206 and the position of the second light receiver determined in step S210 to the external device 30 (step S211).

In one example, the photoreceptor 20 includes 200 light receivers 21, the light reception result of each light receiver 21 has 1 byte, and data indicating the position of each light receiver 21 has 1 byte. In this case, the light reception results of all the light receivers 21 amount to data of 200 bytes, whereas data indicating the positions of the two light receivers 21 has as small as 2 bytes.

The input/output device 100 repeatedly performs the process in FIG. 2. Although the process in FIG. 2 may be performed in any cycle period, the process in FIG. 2 is repeated in, for example, the same cycle as the cycle of light emission of the light emitting device 10.

Figure 3A:
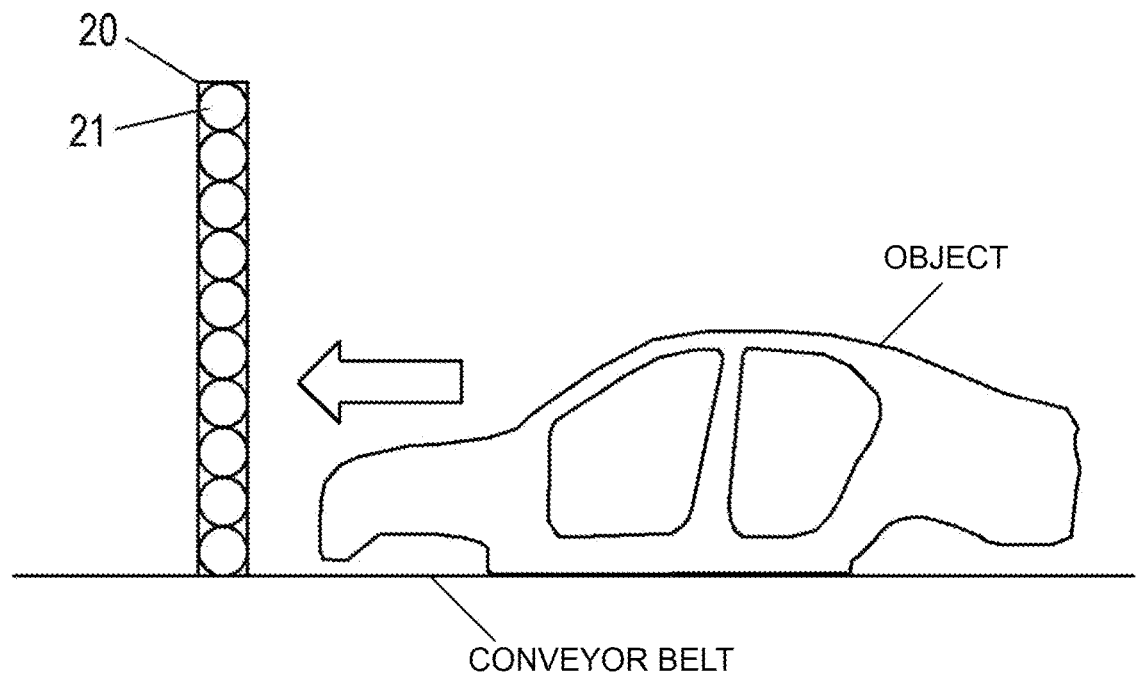
FIGS. 3A and 3B are schematic diagrams showing example manners of carrying an object.
Figure 3B:
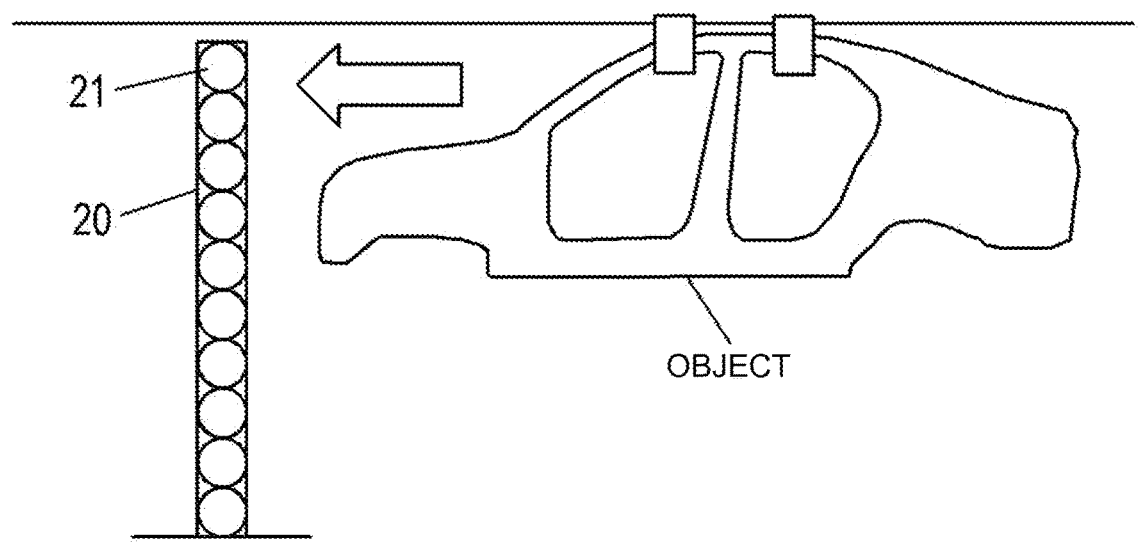

For example, an object (e.g., a car body) horizontally passes between the light emitting device 10 and the photoreceptor 20. For example, as shown in FIG. 3A, the object is carried by a conveyor belt. The object may be carried in any direction or in any manner. As shown in FIG. 3B, the object may be carried while being suspended from above.

Figure 4A:
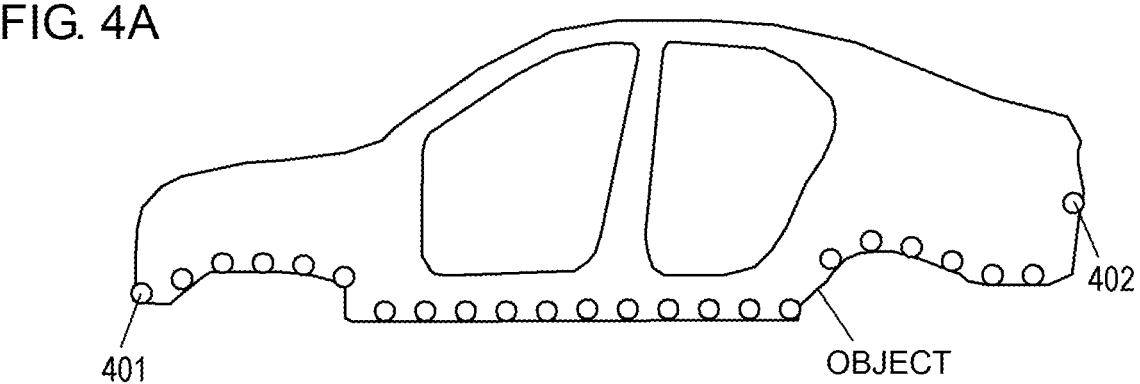
FIG. 4A is a schematic diagram describing the positions of bottom light receivers of light receivers that have received no light.
Figure 4B:
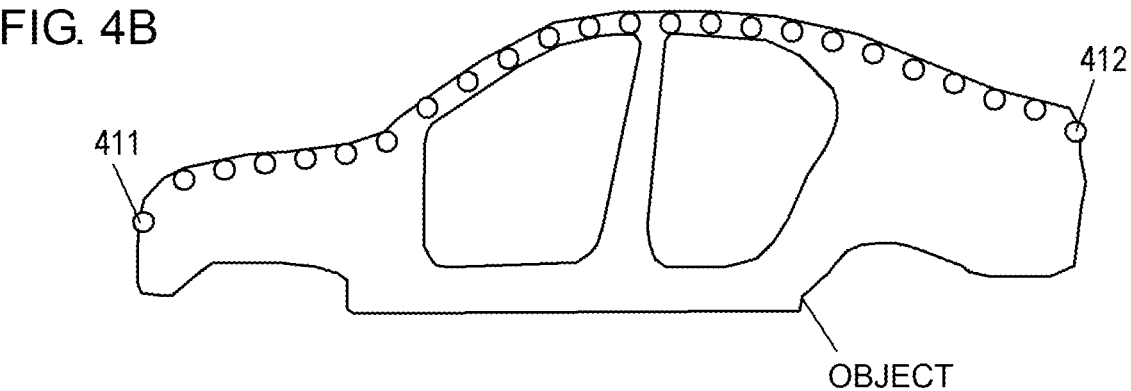
FIG. 4B is a schematic diagram describing the positions of top light receivers of the light receivers that have received no light.

In this case, as the processing in steps S202 to S206 is repeated, multiple positions are detected along the lower surface of the object. More specifically, as shown in FIG. 4A, multiple positions (circles) from a position 401 to a position 402 are sequentially detected. The circles in FIG. 4A denote the positions of the first light receivers (bottom ones of the light receivers 21 that have received no light). Similarly, as the processing in steps S207 to S210 is repeated, multiple positions are detected along the upper surface of the object. More specifically, as shown in FIG. 4B, multiple positions (circles) from a position 411 to a position 412 are sequentially detected. The circles in FIG. 4B denote the positions of the second light receivers (top ones of the light receivers 21 that have received no light).

Figure 5A:
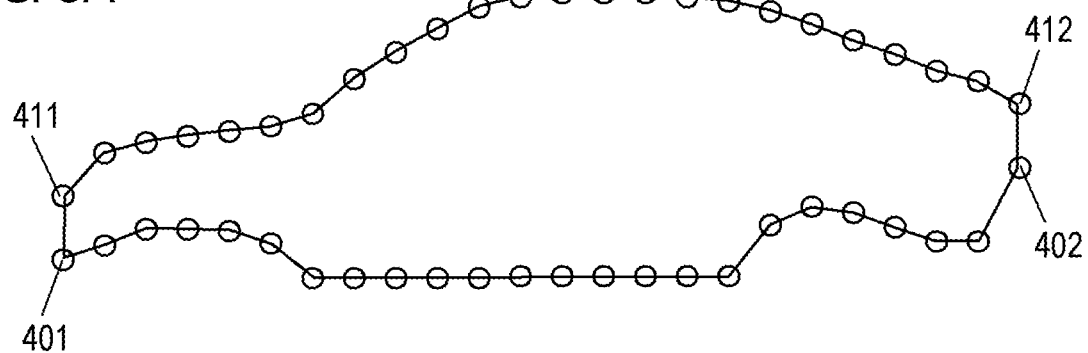
FIG. 5A is a schematic diagram showing an example of the object outline detectable from the positions of the bottom and top light receivers of light receivers 21 that have received no light.

As the processing in step S211 is repeated, the external device 30 repeatedly obtains the positions of the first and second light receivers. More specifically, the external device 30 repeatedly obtains a combination of the positions of the first light receivers (positions corresponding to the bottom of the object) and the positions of the second light receivers (positions corresponding to the top of the object) from the combination of the positions 401 and 411 to the combination of the positions 402 and 412. FIG. 5A shows the multiple positions (circles) obtained by the external device 30. As shown in FIG. 5A, the line connecting the multiple positions (circles) clearly represents the object outline. Thus, the external device 30 can detect the object outline from the obtained positions.

As described above, the structure according to the first embodiment detects the boundary between portions of the photoreceptor 20 that have received light and no light. Data indicating the positions of the detected boundaries is then output to the external device 30, instead of the light reception results of the photoreceptor 20. More specifically, data indicating, from among the boundaries between portions of the photoreceptor 20 that have received light and no light, the positions of a boundary at a first end position in the direction in which the light receivers 21 are arranged and a boundary at a second end position in the arrangement direction is output to the external device 30, instead of the light reception results of the photoreceptor 20. This allows a smaller volume of data to be output to the external device 30 than when the light reception results of the photoreceptor 20 (light reception results of the light receivers 21) are directly output to the external device 30. The external device 30 can detect the outline of the object passing between the light emitting device 10 and the photoreceptor 20.

Although the analyzer 102 simply detects the boundaries output in the form of data from the output unit 103 in the above embodiment, the analyzer 102 may detect more boundaries than the boundaries output in the form of data from the output unit 103.

Figure 5B:
FIG. 5B is a schematic diagram showing an example of the object outline detectable from the position of the top light receiver of the light receivers 21 that have received no light.

Although data indicating the positions of two boundaries is output to the external device 30 in the above embodiment, data indicating the position of a single boundary (boundary at a first end position in the direction in which the light receivers 21 are arranged, from among the boundaries between the portions of the photoreceptor 20 that have received light and no light) may be output to the external device 30. The external device 30 can detect the outline of an object passing between the light emitting device 10 and the photoreceptor 20 from the positions of the light receivers 21 at the first end position of the light receivers 21 that have received no light. For example, the outline of the carried object can be detected by regarding the position of the bottom one of all the light receivers 21 as the bottom position of the carried object and regarding the position of the top one of the light receivers 21 that have received no light as the top position of the carried object (FIG. 5B). In another example, the position of the top one of all the light receivers 21 may be regarded as the top position of the carried object, and the position of the bottom one of the light receivers 21 that have received no light may be regarded as the bottom position of the carried object.

Although a portion of the object outline at the first end position may be detected accurately, a portion of the object outline at the second end position may not be detected accurately. Use of the positions of the boundaries at the first and second end positions allows more accurate detection of the object outline.

Data indicating the positions of all the boundaries may be output to the external device 30. Light from the light emitters 11 is basically interrupted by an object. However, when the object has a hole, light reaches the light receivers 21 through the hole. Thus, the external device 30 can detect the hole in the object from the data indicating the positions of all the boundaries output to the external device 30.

Second Embodiment

A second embodiment of the present invention will be described. In the second embodiment, a sensing system has the structure shown in FIGS. 1A and 1B.

In the second embodiment, the analyzer 102 analyzes the light reception results of the photoreceptor 20 and detects the number of light receivers 21 that have received no light. The output unit 103 outputs data indicating the number detected by the analyzer 102 to the external device 30, instead of the light reception results of the photoreceptor 20. Finding the number of light receivers 21 that have received no light allows detection of the outline of an object passing between the light emitting device 10 and the photoreceptor 20 (described in detail below). In other words, in the above structure, the external device 30 can detect the outline of an object passing between the light emitting device 10 and the photoreceptor 20.

Figure 6:
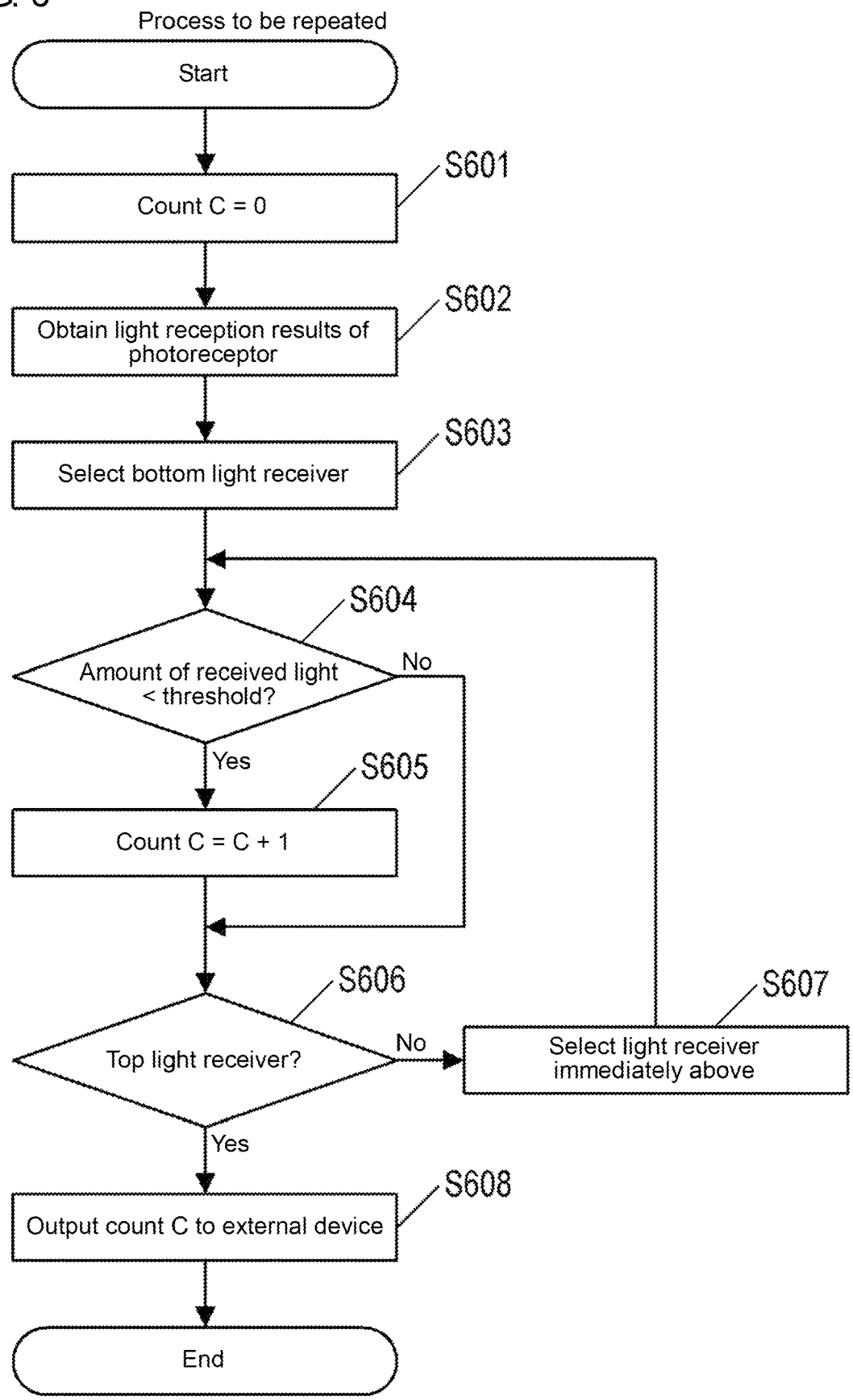
FIG. 6 is a flowchart of an example process of an input/output device according to a second embodiment.

FIG. 6 is a flowchart of an example process of the input/output device 100.

The analyzer 102 first initializes a count C to zero (step S601). The count C indicates the number of light receivers 21 that have received no light.

The obtainer 101 then obtains the light reception results of the photoreceptor 20 (light reception results of the light receivers 21) from the photoreceptor 20 (step S602).

The analyzer 102 then selects the bottom light receiver 21 from the light receivers 21 (step S603).

The analyzer 102 then determines whether the amount of received light of the selected light receiver 21 is below the predetermined threshold (step S604). When the amount of received light is determined to be below the predetermined threshold (Yes in step S604), the processing advances to step S605. When the amount of received light is determined to reach or exceed the predetermined threshold (No in step S604), the processing advances to step S606.

In step S605, the analyzer 102 increments the count C by one. The processing then advances to step S606.

In step S606, the analyzer 102 determines whether the selected light receiver 21 is a top light receiver 21. When the selected light receiver 21 is determined to be the top light receiver 21 (Yes in step S606), the processing advances to step S608. When the selected light receiver 21 is determined not to be the top light receiver 21 (No in step S606), the processing advances to step S607.

In step S607, the analyzer 102 selects the light receiver 21 immediately above the selected light receiver 21 (switches the selected light receiver 21). The processing then returns to step S604. In other words, the processing in steps S604 and S605 is repeated while the light receivers 21 are being selected one by one from the bottom light receiver 21 to the top light receiver 21. Thus, the count C indicates the total of the light receivers 21 that have received no light.

In step S608, the output unit 103 outputs the value of the count C (total of the light receivers 21 that have received no light) to the external device 30.

The input/output device 100 repeatedly performs the process in FIG. 6. Although the process in FIG. 6 may be performed in any cycle period, the process in FIG. 6 is repeated in, for example, the same cycle as the cycle of light emission of the light emitting device 10.

Figure 7A:
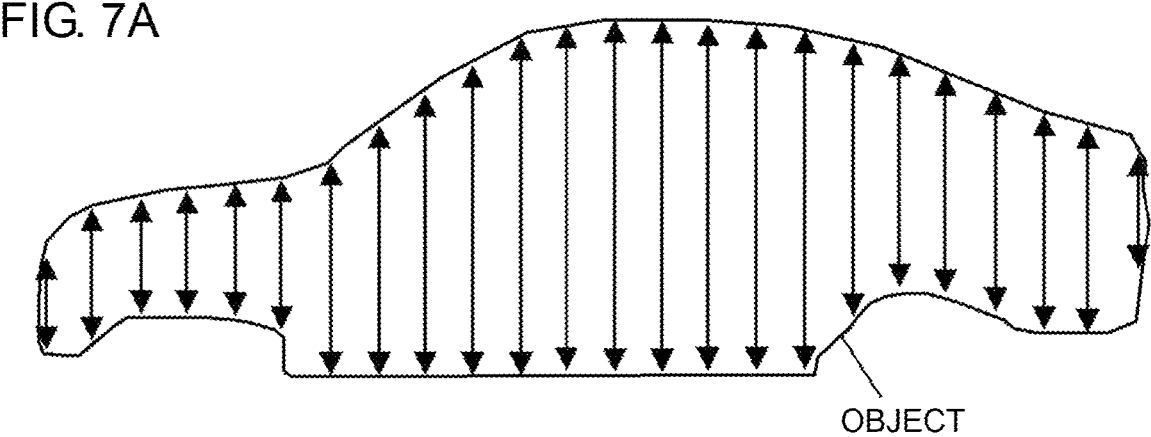
FIG. 7A is a schematic diagram showing an example of the number of light receivers that have received no light corresponding to the vertical dimension of the object.

For example, an object (e.g., a car body) horizontally passes between the light emitting device 10 and the photoreceptor 20. In this case, the processing in steps S601 to S607 is repeated, and the number of light receivers 21 that have received no light is repeatedly detected while the object is changing its horizontal position (position in the horizontal direction). As indicated with arrows in FIG. 7A, the number (total) of light receivers 21 that have received no light corresponds to the vertical dimension of the object.

Figure 7B:
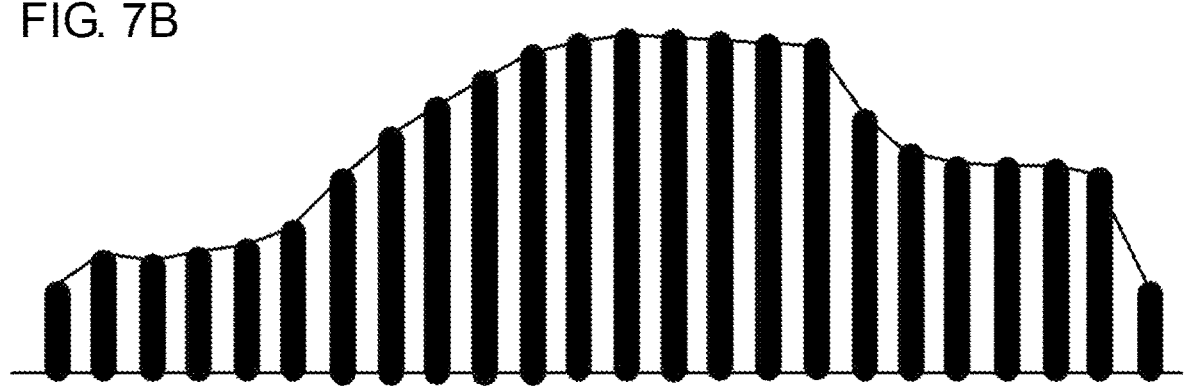
FIG. 7B is a schematic diagram showing an example of the object outline detectable from the number of light receivers that have received no light.

As the processing in step S608 is repeated, the external device 30 repeatedly obtains the value of the number of light receivers 21 that have received no light. As shown in FIG. 7B, a shape similar to the object outline can be detected by regarding the number obtained by the external device 30 (number of light receivers 21 that have received no light) as the height of the object. Thus, the external device 30 can detect the outline of the carried object from the number of light receivers 21 that have received no light.

As described above, the structure according to the second embodiment outputs data indicating the number of light receivers 21 that have received no light to the external device 30, instead of the light reception results of the photoreceptor 20. This allows a smaller volume of data to be output to the external device 30 than when the light reception results of the photoreceptor 20 (light reception results of the light receivers 21) are directly output to the external device 30. The external device 30 can detect the outline of an object passing between the light emitting device 10 and the photoreceptor 20.

In the same manner as in the first embodiment, the bottom and top light receivers 21 of the light receivers 21 that have received no light may be detected. The distance between these detected light receivers 21 may be calculated as the number of light receivers 21 that have received no light.

Third Embodiment

A third embodiment of the present invention will be described. In the third embodiment, a sensing system has the structure shown in FIGS. 1A and 1B.

In the third embodiment, the analyzer 102 analyzes the light reception results and determines whether each of a plurality of groups includes a light receiver 21 of the light receivers 21 that has received light. The groups are fewer than the light receivers 21. The analyzer 102 analyzes the light reception results of the photoreceptor 20 and determines whether each group has received light. The output unit 103 outputs data indicating whether each group has received light to the external device 30, instead of the light reception results of the photoreceptor 20.

Figure 8:
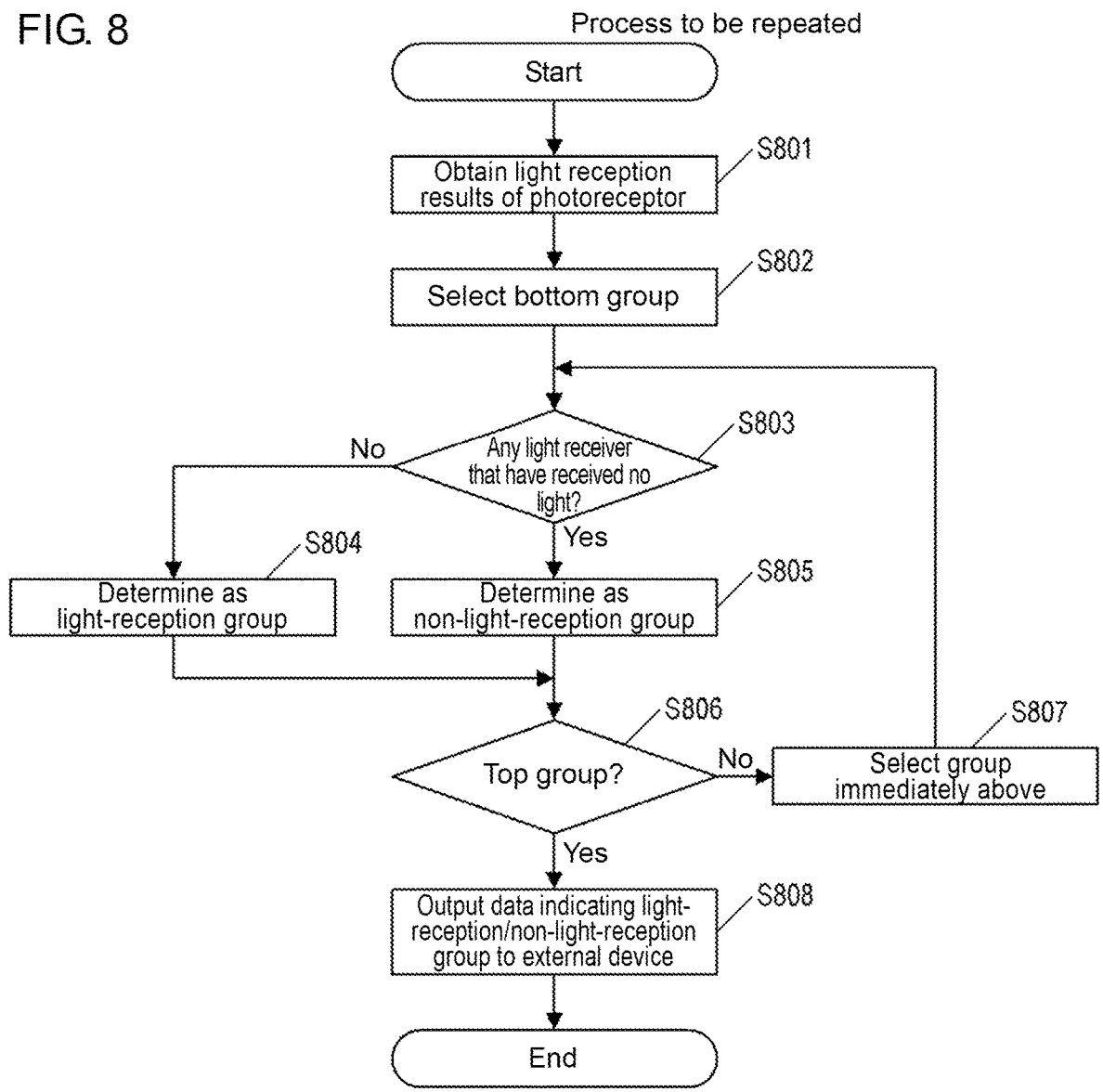
FIG. 8 is a flowchart of an example process of an input/output device according to a third embodiment.

FIG. 8 is a flowchart of an example process of the input/output device 100.

The obtainer 101 first obtains the light reception results of the photoreceptor 20 (light reception results of the light receivers 21) from the photoreceptor 20 (step S801).

The analyzer 102 then selects a bottom group from the groups (step S802).

The analyzer 102 then determines whether the selected group includes any light receiver 21 that has received no light, for example, any light receiver 21 having an amount of received light below a predetermined threshold (step S803). When the selected group is determined to include any light receiver 21 that has received no light (Yes in step S803), the processing advances to step S805. When the selected group is determined not to include any light receiver 21 that has received no light (No in step S803), or more specifically, when all the light receivers 21 in the group have received light, the processing advances to step S804.

In step S804, the analyzer 102 determines the selected group as a light-reception group that has received light. The processing then advances to step S806.

In step S805, the analyzer 102 determines the selected group as a non-light-reception group that has received no light. The processing then advances to step S806.

In step S806, the analyzer 102 determines whether the selected group is a top group. When the selected group is determined to be a top group (Yes in step S806), the processing advances to step S808. When the selected group is determined not to be a top group (No in step S806), the processing advances to step S807.

In step S807, the analyzer 102 selects the group immediately above the selected group (switches the selected group). The processing then returns to step S803. In other words, steps S803 to S805 are repeated while the groups are being selected one by one from the bottom group to the top group.

In step S808, the output unit 103 outputs data indicating the light-reception groups and the non-light-reception groups to the external device 30.

The input/output device 100 repeatedly performs the process in FIG. 8. Although the process in FIG. 8 may be performed in any cycle period, the process in FIG. 8 is repeated in, for example, the same cycle as the cycle of light emission of the light emitting device 10.

Figure 9A:
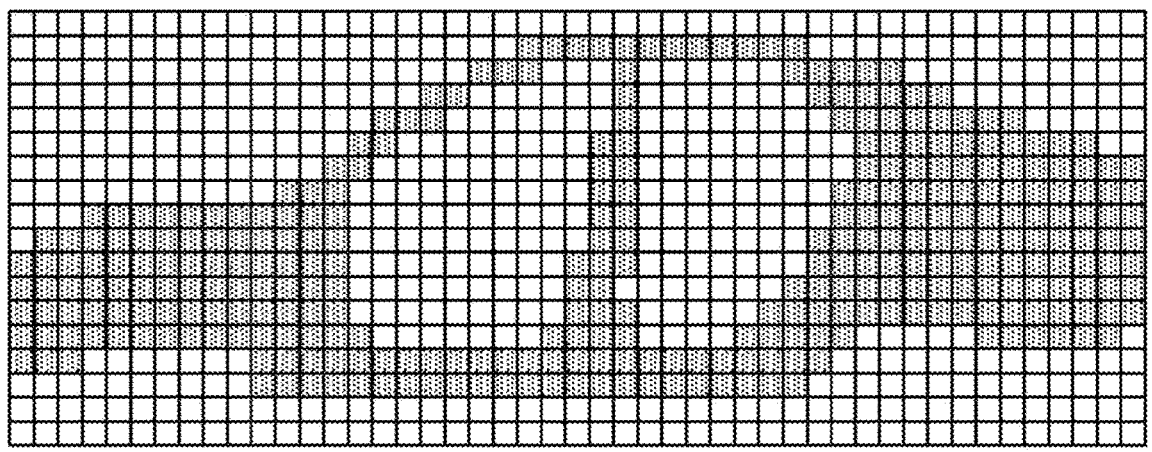
FIG. 9A is a schematic diagram showing example light reception results (received light or no light) from the light receivers.

For example, an object (e.g., a car body) horizontally passes between the light emitting device 10 and the photoreceptor 20. In this case, the processing in step S801 is repeated, and the light reception results of the photoreceptor 20 are repeatedly obtained while the object is changing its horizontal position. FIG. 9A shows example light reception results of the photoreceptor 20. The vertically arranged squares indicate light reception results (light reception results of the light receivers 21) obtained in a single process in step S801. The blank squares indicate light reception, and the gray squares indicate no light reception. In FIG. 9A, the gray area clearly shows the object outline, but includes detailed data about the results of reception with a large data volume.

Figure 9B:
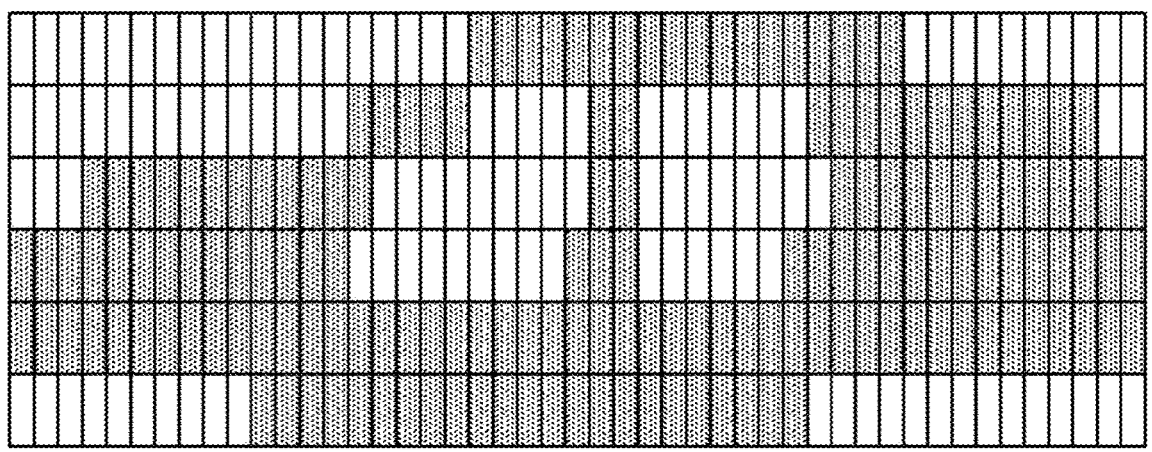
FIG. 9B is a schematic diagram showing example determinations (received light or no light) of multiple groups.

In the third embodiment, as shown in FIG. 9B, every time the light reception result of the photoreceptor 20 (light reception results of the light receivers 21) is obtained, the light receivers 21 are divided into multiple groups fewer than the light receivers 21, and the determination is performed as to whether each group has received light. Although one group may include any number of light receivers 21, one group includes three light receivers 21 in FIG. 9B. The groups are fewer than the light receivers 21. Thus, the groups have a smaller volume of data than the light receivers 21. Also in FIG. 9B, the gray area shows the object outline. The gray area also represents holes (e.g., window frames) in the object. The external device 30 can thus detect the profile (outline and holes) of the carried object from data indicating the light-reception groups and the non-light-reception groups.

As described above, the structure according to the third embodiment outputs data indicating whether each of the groups fewer than the light receivers 21 has received light to the external device 30, instead of the light reception results of the photoreceptor 20. This allows a smaller volume of data to be output to the external device 30 than when the light reception results of the photoreceptor 20 (light reception results of the light receivers 21) are directly output to the external device 30. The external device 30 can detect the outline of an object passing between the light emitting device 10 and the photoreceptor 20. Light from the light emitters 11 is basically interrupted by the object. However, when the object has a hole, light reaches the group (light receivers 21) through the hole. Thus, the external device 30 can detect the hole in the object from the data indicating whether each group has received light.

The structure according to the third embodiment determines the group including no light receivers 21 that have received no light as the group receiving light and the group including the light receivers 21 that have received no light as the group receiving no light. Thus, the external device 30 can detect the object outline slightly larger than the actual outline. The external device 30 may thus perform various processes based on the object size. This structure can prevent, for example, a failure in detecting an anomaly in detecting passage of an object larger than a predetermined size as an anomaly.

Any method may be used for determining whether each group has received light. For example, when a group includes no light receiver 21 that has received light, or more specifically, when all the light receivers 21 included in a group have received no light, the group may be determined to receive no light. When a group includes any light receiver 21 that has received light, the group may be determined to have received light.

<Others>

The above embodiments describe exemplary structures according to one or more aspects of the present invention. The present invention is not limited to the specific embodiments described above, but may be modified variously within the scope of the technical ideas of the invention.

Figure 10:
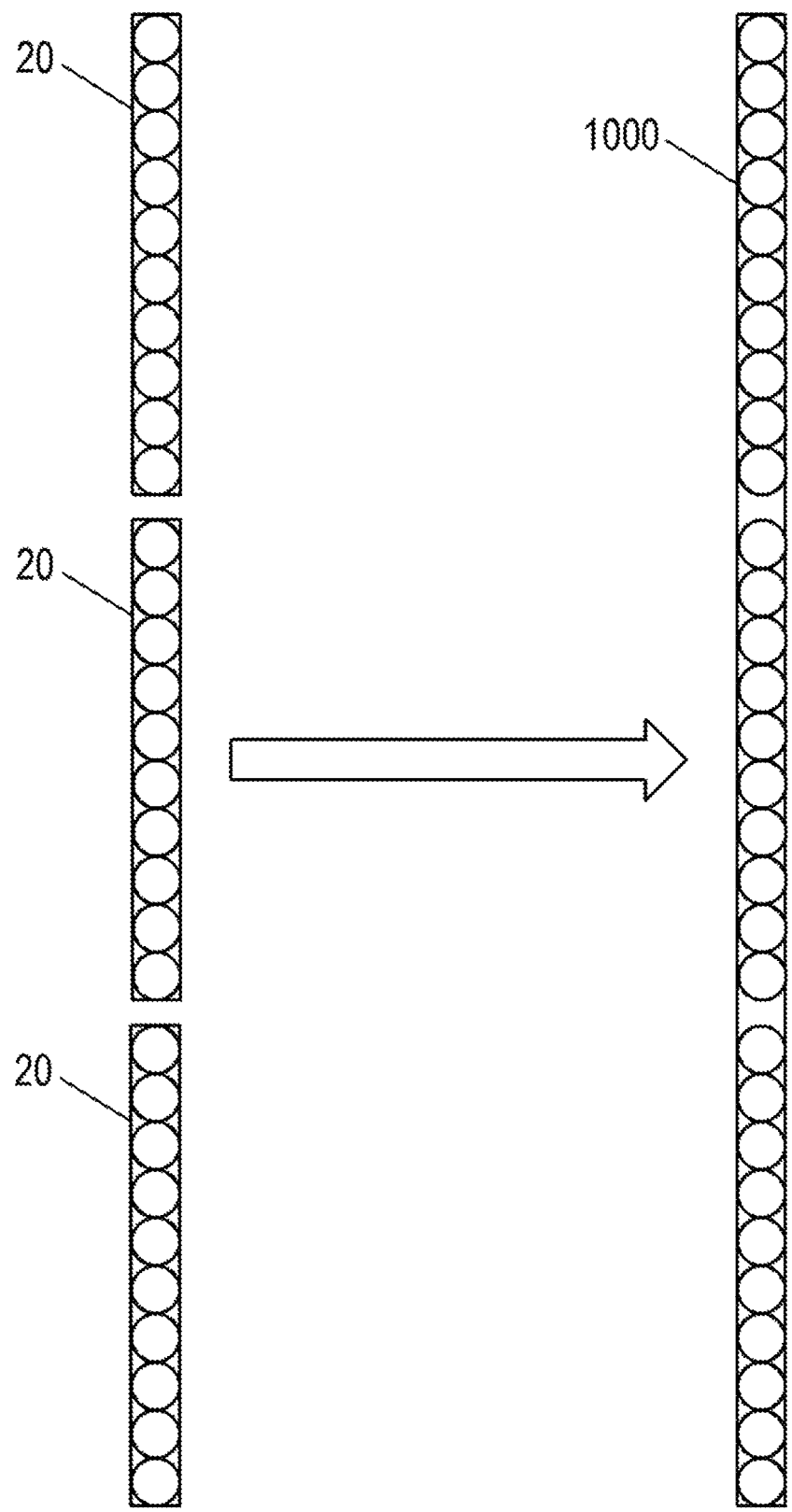
FIG. 10 is a schematic diagram showing multiple photoreceptors regarded as a single photoreceptor in an example.

For example, as shown in FIG. 10, multiple photoreceptors 20 may be connected in use (the sensing system may include any number of photoreceptors 20). In this case, the obtainer 101 obtains the light reception results of the photoreceptors 20. The analyzer 102 may regard the photoreceptors 20 as a single photoreceptor 1000 and analyze the light reception results of the photoreceptors 20. This structure can avoid an increase in the data volume output to the external device 30 when the number of photoreceptors 20 increases.

The output unit 103 may switch between multiple photoreceptors 20, and output data for the switched photoreceptor 20. This structure can output, to the external device 30, more detailed data than when multiple photoreceptors 20 are regarded as a single sensor. In this case, the analyzer 102 may analyze the light reception results of the switched photoreceptor 20 alone. The photoreceptor 20 may be switched automatically or manually. In one example, the output unit 103 switches the photoreceptor 20 in response to a user instruction, and the external device 30 analyzes the obtained data and provides the analytical results to the user. In this case, the user can obtain analytical results for an intended photoreceptor 20.

The output unit 103 may further output data indicating time points corresponding to the light reception results of the photoreceptor 20 to the external device 30. Thus, the external device 30 can manage data to replace the light reception results of the photoreceptor 20 in a manner associated with time points, and thus can provide more useful information to a user. Examples of time points corresponding to the light reception results of the photoreceptor 20 include a time point at which the input/output device 100 obtains the light reception results of the photoreceptor 20 and a time point at which the input/output device 100 outputs data to the external device 30.

<Appendix 1>

An input/output device (100) for receiving light reception results of a sensor (20) and outputting the light reception results to an external device (30), the sensor (20) including a plurality of light receivers (21) to receive light emitted from a plurality of light emitters (11), the input/output device (100) having a smaller maximum volume of data transmittable per unit time in communicating with the external device (30) than in communicating with the sensor (20), the input/output device (100) comprising:
an obtainer (101) configured to obtain the light reception results;
an analyzer (102) configured to analyze the light reception results and detect a boundary between a portion of the sensor (20) that has received light and a portion of the sensor (20) that has received no light; and
an output unit (103) configured to output data indicating a position of the boundary detected by the analyzer (102) to the external device (30).

<Appendix 2>

An input/output device (100) for receiving light reception results of a sensor (20) and outputting the light reception results to an external device (30), the sensor (20) including a plurality of light receivers (21) to receive light emitted from a plurality of light emitters (11), the input/output device (100) having a smaller maximum volume of data transmittable per unit time in communicating with the external device (30) than in communicating with the sensor (20), the input/output device (100) comprising:
an obtainer (101) configured to obtain the light reception results;
an analyzer (102) configured to analyze the light reception results and detect the number of light receivers (21) that have received no light; and
an output unit (103) configured to output data indicating the number detected by the analyzer (102) to the external device (30).

<Appendix 3>

An input/output device (100) for receiving light reception results of a sensor (20) and outputting the light reception results to an external device (30), the sensor (20) including a plurality of light receivers (21) to receive light emitted from a plurality of light emitters (11), the input/output device (100) having a smaller maximum volume of data transmittable per unit time in communicating with the external device (30) than in communicating with the sensor (20), the input/output device (100) comprising:
an obtainer (101) configured to obtain the light reception results;
an analyzer (102) configured to analyze the light reception results and determine whether each of a plurality of groups includes a light receiver (21) of the plurality of light receivers (21) that has received light, the plurality of groups being fewer than the plurality of light receivers (21); and
an output unit (103) configured to output data indicating whether each of the plurality of groups has received light to the external device (30).

<Appendix 4>

A method for controlling an input/output device (100) for receiving light reception results of a sensor (20) and outputting the light reception results to an external device (30), the sensor (20) including a plurality of light receivers (21) to receive light emitted from a plurality of light emitters (11), the input/output device (100) having a smaller maximum volume of data transmittable per unit time in communicating with the external device (30) than in communicating with the sensor (20), the method comprising:
(S201) obtaining the light reception results;
(S202 to S210) analyzing the light reception results and detecting a boundary between a portion of the sensor (20) that has received light and a portion of the sensor (20) that has received no light; and
(S211) outputting data indicating a position of the boundary detected in (S202 to S210) the analyzing to the external device (30).

<Appendix 5>

A method for controlling an input/output device (100) for receiving light reception results of a sensor (20) and outputting the light reception results to an external device (30), the sensor (20) including a plurality of light receivers (21) to receive light emitted from a plurality of light emitters (11), the input/output device (100) having a smaller maximum volume of data transmittable per unit time in communicating with the external device (30) than in communicating with the sensor (20), the method comprising:
(S602) obtaining the light reception results;
(S603 to S607) analyzing the light reception results and detecting the number of light receivers (21) that have received no light; and
(S608) outputting data indicating the number detected in (S603 to S607) the analyzing to the external device (30).

<Appendix 6>

A method for controlling an input/output device (100) for receiving light reception results of a sensor (20) and outputting the light reception results to an external device (30), the sensor (20) including a plurality of light receivers (21) to receive light emitted from a plurality of light emitters (11), the input/output device (100) having a smaller maximum volume of data transmittable per unit time in communicating with the external device (30) than in communicating with the sensor (20), the method comprising:
(S801) obtaining the light reception results;
(S802 to S807) analyzing the light reception results and determining whether each of a plurality of groups includes a light receiver of the plurality of light receivers that has received light, the plurality of groups being fewer than the plurality of light receivers; and
(S808) outputting data indicating whether each of the plurality of groups has received light to the external device (30).

REFERENCE SIGNS LIST

| | | | |
|---|---|---|---|
| 100: input/output device | 101: obtainer | 102: analyzer | 103: output unit |
| 10: light emitting device | 11: light emitter | 20, 1000: photoreceptor | 21: light receiver  30: external device |

The invention claimed is:

1. An input/output device for receiving light reception results of a sensor and outputting the light reception results to an external device, the sensor including a plurality of light receivers to receive light emitted from a plurality of light emitters, the input/output device having a smaller maximum volume of data transmittable per unit time in communicating with the external device than in communicating with the sensor, the input/output device comprising:
an obtainer configured to obtain the light reception results;
an analyzer configured to analyze the light reception results and repeatedly calculate a number of the light receivers, among the plurality of light receivers, that have received no light in any cycle period while an object passes between the plurality of light emitters and the plurality of light receivers; and
an output unit configured to output data indicating the number of the light receivers calculated by the analyzer to the external device.

2. The input/output device according to claim 1, wherein the analyzer analyzes the light reception results and detects a boundary between a portion of the sensor that has received light and a portion of the sensor that has received no light, and the output unit outputs, to the external device, data indicating a position of, from among boundaries between portions of the sensor that have received light and portions of the sensor that have received no light, a boundary at a first end position in a direction in which the plurality of light receivers are arranged.

3. The input/output device according to claim 1, wherein the analyzer analyzes the light reception results and detects a boundary between a portion of the sensor that has received light and a portion of the sensor that has received no light, and the output unit outputs, to the external device, data indicating positions of, from among boundaries between portions of the sensor that have received light and portions of the sensor that have received no light, a boundary at a first end position in a direction in which the plurality of light receivers are arranged and a boundary at a second end position in the direction in which the plurality of light receivers are arranged.

4. The input/output device according to claim 1, wherein the analyzer analyzes the light reception results and determines whether each of a plurality of groups of light receivers includes a light receiver of the plurality of light receivers that has received light, the plurality of groups of light receivers being fewer than the plurality of light receivers, and the output unit outputs data indicating whether each of the plurality of groups of light receivers has received light to the external device.

5. The input/output device according to claim 4, wherein the analyzer determines a first group of light receivers including no light receiver that has received no light as a group of light receivers receiving light and a second group of light receivers including a light receiver that has received no light as a group of light receivers receiving no light.

6. The input/output device according to claim 4, wherein the analyzer determines a first group of light receivers including any light receiver that has received light as a group of light receivers receiving light and a second group of light receivers including no light receiver that has received light as a group of light receivers receiving no light.

7. The input/output device according to claim 1, wherein the obtainer obtains light reception results of a plurality of sensors, and the analyzer regards the plurality of sensors as a single sensor and analyzes the light reception results of the plurality of sensors.

8. The input/output device according to claim 1, wherein the obtainer obtains light reception results of a plurality of sensors, and the output unit switches between the plurality of sensors, and outputs data for the switched sensor.

9. The input/output device according to claim 1, wherein the output unit further outputs data indicating time points corresponding to the light reception results to the external device.

10. A method for controlling an input/output device for receiving light reception results of a sensor and outputting the light reception results to an external device, the sensor including a plurality of light receivers to receive light emitted from a plurality of light emitters, the input/output device having a smaller maximum volume of data transmittable per unit time in communicating with the external device than in communicating with the sensor, the method comprising:
obtaining the light reception results;
analyzing the light reception results;
calculating, repeatedly, a number of the light receivers, among the plurality of light receivers, that have received no light in any cycle period while an object passes between the plurality of light emitters and the plurality of light receivers; and
outputting data indicating the calculated number of the light receivers to the external device.

11. A non-transitory computer readable medium storing a program for causing a computer to perform the obtaining, the analyzing, and the outputting in the method according to claim 10.

12. The method for controlling the input/output device according to claim 10, further comprising:
determining whether each of a plurality of groups of light receivers includes a light receiver of the plurality of light receivers that has received light, the plurality of groups of light receivers being fewer than the plurality of light receivers; and
outputting data indicating whether each of the plurality of groups of light receivers has received light to the external device.

13. The method for controlling the input/output device according to claim 12, further comprising determining a first group of light receivers including no light receiver that has received no light as a group of light receivers receiving light and a second group of light receivers including a light receiver that has received no light as a group of light receivers receiving no light.

14. The method for controlling the input/output device according to claim 12, further comprising determining a first group of light receivers including any light receiver that has received light as a group of light receivers receiving light and a second group of light receivers including no light receiver that has received light as a group of light receivers receiving no light.

* * * * *